United States Patent Office 3,484,505
Patented Dec. 16, 1969

3,484,505
ADDITION REACTION PRODUCT OF OXYALKYLENATED PHOSPHORUS COMPOUND AND N-POLYMER OF EPIHALOHYDRIN AND AMINE AND USE THEREOF
Henryk A. Cyba, Evanston, Ill., assignor to Universal Oil Products Company, Des Plaines, Ill., a corporation of Delaware
No Drawing. Original application Dec. 12, 1963, Ser. No. 330,006, now Patent No. 3,359,347, dated Dec. 19, 1967. Divided and this application Sept. 11, 1967, Ser. No. 666,916
Int. Cl. C07f 9/16; C08f 51/00; C10m 1/48
U.S. Cl. 260—925         10 Claims

ABSTRACT OF THE DISCLOSURE

Addition reaction product of oxyalkylenated hydroxyhydrocarbon phosphate or thiophosphate and polymeric reaction product containing basic nitrogen, the latter being the reaction product of an epihalohydrin and an amine, and esters of said reaction product. These addition products are particularly useful as additives to organic substances as exemplified by their use as additives in lubricating compositions.

CROSS REFERENCE TO RELATED APPLICATIONS

This is a division of copending application Ser. No. 330,006, filed Dec. 12, 1963, now Patent 3,359,347, issued Dec. 19, 1967.

DESCRIPTION OF THE INVENTION

This application relates to a novel composition of matter comprising the addition reaction product of oxyalkylenated hydroxyhydrocarbon phosphate or oxyalkylated hydroxyhydrocarbon thiophosphate and polymeric reaction product containing basic nitrogen, and to the use thereof.

As will be set forth in detail hereinafter, the addition reaction products of the present invention are especially useful as additives to organic substances and particularly lubricating compositions comprising a major proportion of an oil of lubricating viscosity. With the increased technology in the art of lubrication, there is an ever increasing need for lubricants which will withstand the increasing severity requirements of such oils. While improved lubricants have been developed, it still is necessary to further improve these lubricants and this is accomplished by incorporating one or more additives into the lubricant. The novel addition reaction product of the present invention serves to improve the lubricants in a number of ways including one or more of extreme pressure (E.P.) additive, oxidation inhibitor, rust and/or corrosion inhibitor, antiwear agent, vicosity index improver, pour point depressant, etc., and, in addition, serves as a detergent and dispersant. The oxyalkylenated hydroxyhydrocarbon phosphate or thiophosphate and the polymeric condensation product containing basic nitrogen are provided as a unitary product in which the various components, apparently due to close physical and chemical association, co-act to produce an additive of improved properties.

In one embodiment the present invention relates to the addition reaction product of an oxyalkylenated hydroxyhydrocarbon compound selected from the group consisting of oxyalkylenated hydroxyhydrocarbon phosphate and oxyalkylenated hydroxyhydrocarbon thiophosphate and polymeric reaction product containing basic nitrogen, the latter comprising the reaction product of an epihalohydrin and an amine, and esters of said reaction product.

In another embodiment the present invention relates to the use of the addition reaction product as an additive in organic substances including hydrocarbon oils and particularly lubricants.

As an essential feature of the present invention, an oxyalkylenated hydroxyhydrocarbon phosphate or oxyalkylenated hydroxyhydrocarbon thiophosphate is used in preparing the addition reaction product. In general, the di-(oxyalkylenated hydroxyhydrocarbon)-phosphate or dithiophosphate is preferred, although the corresponding mono-oxyalkylenated hydroxyhydrocarbon phosphate or dithiophosphate may be used.

In a preferred embodiment, the oxyalkylenated hydroxyhydrocarbon phosphate is di-(oxyalkylenated alkylphenol)-phosphate including oxyalkylenated alkylphenol phosphate and oxyalkylenated polyalkylphenol phosphate. While the alkyl group or groups each may contain from one to five carbon atoms, in a preferred embodiment the alkyl group or groups contain from six to twenty or more carbon atoms each. Also, the oxyalkylene group preferably comprises oxyethylene or oxypropylene, although it may comprise an oxy group containing from four to eight or more carbon atoms. The number of oxyalkylene groups preferably ranges from one to fifteen per each alkylphenyl group although, when desired, it may range up to thirty or more oxyalkylene groups. When used in the present specifications and claims, it is understood that the number of oxyalkylene groups means the number per each alkylphenyl or long chain alkyl group. The following oxyalkylenated alkylphenol phosphates are illustrative. In the interest of brevity, the specific compounds will be described as the oxyethylenated derivatives, with the understanding that the corresponding compounds in which the oxyethylene group contains a larger number of carbon atoms are included within the present invention. The preferred oxyethylenated derivatives include di-(oxyethylenated hexylphenol)-phosphate containing from one to fifteen oxyethylene groups, di-(oxyethylenated dihexylphenol)-phosphate containing from one to fifteen oxyethylene groups, di-oxyethylenated heptylphenol)-phosphate containing from one to fifteen oxyethylene groups, di-(oxyethylenated diheptylphenol)-phosphate containing from one to fifteen oxyethylene groups, di-(oxyethylenated octylphenol)-phosphate containing from one to fifteen oxyethylene groups, di-(oxyethylenated dioctylphenol)-phosphate containing from one to fifteen oxyethylene groups, di-(oxyethylenated nonylphenol)-dithiophosphate containing from one to fifteen oxyethylene groups, di(oxyethylenated dinonylphenol)-phosphate containing from one to fifteen oxyethylene groups, di-(oxyethylenated decylphenol)-phosphate containing from one to fifteen oxyethylene groups, di-(oxyethylenated didecylphenol)-phosphate containing from one to fifteen oxyethylene groups, di-(oxyethylenated undecyclphenol)-phosphate containing from one to fifteen oxyethylene groups, di-oxyethylenated diundecylphenol)-phosphate containing from one to fifteen oxyethylene groups, di-(oxyethylenated dodecylphenol) - phosphate containing from one to fifteen oxyethylene groups, di-(oxyethylenated didodecylphenol)-phosphate containing from one to fifteen oxyethylene groups, etc. It is understood that the corresponding mono-oxyalkylenated alkylphenol phosphates may be used.

Preferred oxyalkylenated alkylphenol thiophosphates include the following. Here again, only the oxyethylene derivatives are specifically set forth in the interest of brevity. These preferred dithiophosphates include di-(oxyethylenated hexylphenol)-dithiophosphate containing from one to fifteen oxyethylene groups, di-(oxyethylenated dihexylphenol)-dithiophosphate containing from one to fifteen oxyethylene groups, di-(oxyethylenated heptylphenol)-dithiophosphate containing from one to fifteen oxyethylene groups, di-(oxyethylenated diheptylphenol)-dithiophosphate containing from one to fifteen oxyethylene groups, di-(oxyethylenated octylphenol)-dithiophosphate containing from one to fifteen oxyethylene groups, di-(oxyethylenated dioctylphenol)-dithiophosphate containing from one to fifteen oxyethylene groups, di-(oxyethylenated nonylphenol)-dithiophosphate containing from one to fifteen oxyethylene groups, di-(oxyethylenated dinonylphenol)-dithiophosphate containing from one to fifteen oxyethylene groups, di-(oxyethylenated decylphenol)-dithiophosphate containing from one to fifteen oxyethylene groups, di-(oxyethylenated didecylphenol)-dithiophosphate containing from one to fifteen oxyethylene groups, di-(oxyethylenated undecylphenol)-dithiophosphate containing from one to fifteen oxyethylene groups, di-(oxyethylenated diundecylphenol)-dithiophosphate containing from one to fifteen oxyethylene groups, di-(oxyethylenated dodecylphenol)-dithiophosphate containing from one to fifteen oxyethylene groups, di-(oxyethylenated didodecylphenol)-dithiophosphate containing from one to fifteen oxyethylene groups, etc. It is understood that the corresponding mono-oxyalkylenated alkylphenol dithiophosphates or the corresponding oxyalkylenated alkylphenol monothiophosphates may be used.

In another embodiment the oxyalkylenated hydroxyhydrocarbon phosphate comprises an oxyalkylenated aliphatic alcohol phosphate, the aliphatic alcohol being of long chain and preferably containing at least six and up to fifty carbon atoms. Preferred oxyalkylenated alkanol phosphates in this embodiment include the following. Here again, in the interest of brevity, only the oxyethylene derivatives are specifically recited with the understanding that the corresponding oxyalkylenated derivatives containing from three to eight or more carbon atoms in the oxyalkylene group may be used. The preferred oxyethylene derivatives in this embodiment are di-(oxyethylenated hexanol)-phosphate containing from one to fifteen oxyethylene groups, di-(oxyethylenated heptanol)-phosphate containing from one to fifteen oxyethylene groups, di-(oxyethylenated octanol)-phosphate containing from one to fifteen oxyethylene groups, di-oxyethylenated nonanol)-phosphate containing from one to fifteen oxyethylene groups, di-(oxyethylenated decanol)-phosphate containing from one to fifteen oxyethylene groups, di-(oxyethylenated undecanol)-phosphate containing from one to fifteen oxyethylene groups, di-(oxyethylenated dodecanol)-phosphate containing from one to fifteen oxyethylene groups, di-(oxyethylenated tridecanol)-phosphate containing from one to fifteen oxyethylene groups, di-(oxyethylenated tetradecanol)-phosphate containing from one to fifteen oxyethylene groups, di-(oxyethylenated pentadecanol)-phosphate containing from one to fifteen oxyethylene groups, di-(oxyethylenated hexadecanol)-phosphate containing from one to fifteen oxyethylene groups, di-(oxyethylenated heptadecanol)-phosphate containing from one to fifteen oxyethylene groups, di(oxyethylenated octadecanol)-phosphate containing from one to fifteen oxyethylene groups, di-(oxyethylenated nonadecanol)-phosphate containing from one to fifteen oxyethylene groups, di-(oxyethylenated eicosanol)-phosphate containing from one to fifteen oxyethylene groups, etc. Here again, it is understood that the corresponding mono-(oxyalkylenated alkanol)-phosphate may be used.

Illustrative preferred oxyalkylenated alkanol thiophosphates include the following. Here again, only the oxyethylenated derivatives are set forth with the understanding that the corresponding derivatives in which the oxyalkylene group contains from three to eight or more carbon atoms may be used. The preferred thiophosphates in this embodiment include di-(oxyethylenated hexanol)-dithiophosphate containing from one to fifteen oxyethylene groups, di-(oxyethylenated heptanol)-dithiophosphate containing from one to fifteen oxyethylene groups, di-(oxyethylenated octanol)-dithiophosphate containing from one to fifteen oxyethylene groups, di-(oxyethylenated nonanol)-dithiophosphate containing from one to fifteen oxyethylene groups, di-(oxyethylenated decanol)-dithiophosphate containing from one to fifteen oxyethylene groups, di-(oxyethylenated undecanol)-dithiophosphate containing from one to fifteen oxyethylene groups, di-(oxyethylenated dodecanol)-dithiophosphate containing from one to fifteen oxyethylene groups, di-(oxyethylenated tridecanol)-dithiophosphate containing from one to fifteen oxyethylene groups, di-(oxyethylenated tetradecanol)-dithiophosphate containing from one to fifteen oxyethylene groups, di-(oxyethylenated pentadecanol)-dithiophosphate containing from one to fifteen oxyethylene groups, di-(oxyethylenated hexadecanol)-dithiophosphate containing from one to fifteen oxyethylene groups, di-(oxyethylenated heptadecanol)-dithiophosphate containing from one to fifteen oxyethylene groups, di-(oxyethylenated octadecanol)-dithiophosphate containing from one to fifteen oxyethylene groups, di-(oxyethylenated nonadecanol)-dithiophosphate containing from one to fifteen oxyethylene groups, di-(oxyethylenated eicosanol)-dithiophosphate containing from one to fifteen oxyethylene groups, etc. It is understood that the corresponding mono-oxyalkylenated alkanol dithiophosphate or the corresponding oxyalkylenated alkanol monothiophosphate may be used.

The oxyalkylenated phenol phosphate or oxyalkylenated alkanol phosphate is prepared in any suitable manner. In a preferred embodiment the alkylphenol or alkanol is first oxyalkylenated and then is converted to the phosphate or thiophosphate. Oxyalkylenation of the alkylphenol or alkanol is effected in any suitable manner. In one method this is accomplished by reacting the phenol or alkanol with the alkylene oxide, particularly ethylene oxide, in the molar ratios to produce the oxyalkylenated phenol or alkanol containing the oxyalkylenated group in the desired proportion. The oxyalkylenation generally is conducted at a temperature more particularly from about room temperature to of from about room temperature to about 350° F. and about 200° to about 300° F. When polyoxyalkylenation is desired, the reaction is effected in the presence of a catalyst such as potassium hydroxide, sodium hydroxide, tertiary amine, quaternary hydroxide, etc. When the oxyalkylenation is to be limited to the addition of one oxy group, the catalyst is used with the alkanols but may be omitted with the alkylphenols. Super-atmospheric pressure may be employed which may range from about 10 to 1000 pounds or more.

The oxyalkylenated aromatic or aliphatic alcohol then is reacted in any suitable manner with $P_2O_5$ to form the desired phosphate or with $P_2S_5$ to form the desired thiophosphate. In preparing the phosphate, one molar proportion of $P_2O_5$ or other suitable phosphorus oxide is reacted per one or two molar proportions of the oxyalkylenated hydroxyhydrocarbon. In general, an excess of $P_2O_5$ is employed in order to insure complete reaction. The reaction is effected at a temperature within the range of from about room temperature to about 230° F. and under substantially anhydrous conditions. The resultant free acid form of the phosphate generally is recovered as a viscous liquid.

When the dithiophosphate is prepared, the oxyalkylenated hydroxyhydrocarbon is reacted in any suitable manner with phosphorus pentasulfide or other suitable phosphorus sulfide to form the desired thiophosphate. At the present time there are different schools of thought as to the structure of phosphorus pentasulfide. It is believed to be $P_2S_5$, but also has been expressed as $P_4S_{10}$. Various structures have been proposed including a polymeric cage-like configuration. Regardless of the exact structure of this compound, phosphorus pentasulfide is available commercially and is used for reaction with the oxyalkylenated hydroxyhydrocarbon in the manner herein set forth. In the interest of simplicity, phosphorus pentasulfide is also referred to in the present specifications as $P_2S_5$, with the understanding that this is intended to cover the phosphorus pentasulfide available commercially or prepared in any suitable manner. The di-(oxyalkylenated hydroxyhydrocarbon) - dithiophosphate is prepared by the reaction of four mole proportions of the oxyalkylenated hydroxyhydrocarbon with one mole proportion of $P_2S_5$. Generally, an excess of $P_2S_5$ is used in order to insure complete reaction, which excess usually will not be above about 25% by weight of the stoichiometric amount of $P_2S_5$. The reaction conveniently is effected by heating the oxyalkylenated hydroxyhydrocarbon and, with intimate stirring, adding the $P_2S_5$ thereto, preferably in incremental portions. The reaction is effected by refluxing the mixture of reactants to effect formation of the di-(oxyalkylenated hydroxyhydrocarbon)-dithiophosphate with the liberation of one mole proportion of hydrogen sulfide.

The reaction preferably is effected in the presence of a solvent and the temperature of refluxing accordingly will depend upon the specific solvent used. Any suitable solvent may be employed. Preferred solvents comprise aromatic hydrocarbons and include particularly benzene. When using benzene as the solvent, the refluxing temperature will be in the order of 175° F. Other aromatic solvent include toluene, xylene, ethyl benzene, cumene, etc., or mixtures thereof. In another embodiment the solvent may comprise a paraffinic hydrocarbon or mixtures thereof which preferably are selected from hexane, heptane, octane, nonane, decane, undecane, dodecane, etc. As hereinbefore set forth, the refluxing temperature will depend upon the particular solvent employed and thus may range from about 140° and preferably should not exceed about 215° F. The reaction may be effected at atmospheric pressure or, when desired, at subatmospheric pressure or superatmospheric pressure.

Hydrogen sulfide is formed in the above reaction and preferably is continuously removed from the reaction zone. After completion of the reaction, the reaction mass may be filtered to remove unreacted $P_2S_5$, if any. In one embodiment the product may be recovered in solution in the benzene or other solvent or, when desired, the benzene solvent may be removed in any suitable manner such as by distillation, preferably under vacuum. The di-(oxyalkylenated hydroxyhydrocarbon) - dithiophosphate is recovered as a liquid of medium viscosity.

While the di-(oxyalkylenated hydroxyhydrocarbon)-dithiophosphate is a preferred reactant for forming the addition reaction product of the present invention, it is understood that the use of the mono-(oxyalkylenated hydroxyhydrocarbon) - dithiophosphate also is comprised within the scope of the present invention, as well as the mono- and/or di-(oxyalkylenated hydroxyhydrocarbon)-monothiophosphate. The latter compound may be prepared, for example, by reacting di-(oxyalkylenated hydroxyhydrocarbon)-phosphite or the sodium salt thereof with free sulfur.

The oxyalkylenated hydroxyhydrocarbon phosphate or thiophosphate is reacted with a polymeric reaction product containing basic nitrogen to form the novel addition product of the present invention.

In one embodiment, the polymeric reaction product containing basic nitrogen is obtained by reacting an epihalohydrin compound with an amine compound. A preferred epihalohydrin compound is epichlorohydrin. Other epichlorohydrin compounds include 1,2-epi-4-chlorobutane, 2,3-epi-4-chlorobutane, 1,2-epi-5-chloropentane, 2,3-epi-5-chloropentane, etc. While the chloro derivatives are preferred, it is understood that the corresponding bromo and iodo compounds may be employed.

One mole proportion of the epihalohydrin compound is reacted with one mole proportion of a suitable amine. Preferred amines include primary alkyl amines and preferably those containing from about twelve to about forty carbon atoms per molecule. Illustrative primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly from mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing sixteen to eighteen carbon atoms per alkyl group, although they contain a small amount of alkyl groups having fourteen carbon atoms.

Illustrative examples of secondary amines, which may be reacted with the epihalohydrin compound, include di-(dodecyl) amine, di-tridecyl) amine, di-(tetradecyl) amine, di-(pentadecyl) amine, di-(hexadecyl) amine, di-heptadecyl) amine, di-(octadecyl) amine, di-(nonadecyl) amine, di-(eicosyl) amine, etc. In another embodiment, which is not necessarily equivalent, the secondary amine will contain one alkyl group having at least twelve carbon atoms and another alkyl group having less than twelve carbon atoms. Illustrative examples of such compounds include N-propyl-N-dodecyl amine, N-butyl-N-dodecyl amine, N-pentyl-N-dodecyl amine, N-butyl-N-tridecyl amine, N-pentyl-N-tridecyl amine, etc. Here again, mixtures of secondary amines are available commercially, usually at a lower price, and such mixtures may be used in accordance with the present invention. An example of such a mixture available commercially is "Armeen 2HT" which consists primarily of di-(octadecyl) amine and di-(hexadecyl) amine.

Preferred examples of N-alkyl polyamines, which may be reacted with the epihalohydrin compound, comprise N-alkyl-1,3-diaminopropanes in which the alkyl group contains at least twelve carbon atoms. Illustrative examples include N-dodecyl-1,3-diaminopropane, N-tridecyl-1,3-diaminopropane, N-tetradecyl - 1,3 - diaminopropane, N-pentadecyl - 1,3 - diaminopropane, N-hexadecyl-1,3-diaminopropane, N-heptadecyl-1,3-diaminopropane, N-octadecyl-1,3-diaminopropane, N - nonadecyl-1,3-diaminopropane, N-eicosyl-1,3-diaminopropane, N-heneicosyl-1,3-diaminopropane, N-docosyl-1,3-diaminopropane, N-tricosyl-1,3-diaminopropane, N-tetracosyl-1,3-diaminopropane, N-pentacosyl-1,3-diaminopropane, etc. As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing fourteen carbon atoms each. Another mixture available commercially is N-coco-1,3-diaminopropane which contains alkyl groups predominating in twelve to fourteen carbon atoms each. Still another example is N-soya-1,3-diaminopropane which predominates in alkyl groups containing eighteen carbon atoms per group, although it contains a small amount of alkyl groups having sixteen carbon atoms. It is understood that corresponding N-alkyl diaminobutanes, N-alkyl diaminopentanes, N-alkyl diaminohexanes, etc., may be employed.

In still another embodiment the amine comprises an alkylene polyamine including ethylenediamine, diethylenetriamine, triethylenetetraamine, tetraethylenepentaamine, pentaethylenehexaamine, etc., similar propylene and polypropylene polyamines, butylene and polybutleyne polyamines, etc., and particularly these alkylene polyamines in which one or more of the nitrogen atoms are substituted with an alkyl group and preferably an alkyl group containing from about six to about twentycarbon atoms each or a cycloalkyl group including particularly cyclohexyl, alkylcyclohexyl, polyalkylcyclohexyl, etc. It is understood that a mixture of different amines and/or different halo epoxides may be used.

The epihalohydrin and amine are reacted in any suitable manner. In a preferred embodiment, the reactants are prepared as solutions in suitable solvents, particularly alcohols such as ethanol, propanol, butanol, etc., and one of the solutions is added gradually, with stirring, to the other solution, and reacted at a temperature of from about 65° to about 215° F. and preferably 120° F. to about 215° F., and for a sufficient time to effect polymer formation, which generally will range from about two and preferably from about four to twenty-four hours or more.

In still another embodiment the polymeric reaction product formed by the reaction of the epihalohydrin compound and amine is reacted with an acid to form the ester which is later used in preparing the addition reaction product of the present invention. In one embodiment the acid is a low molecular weight acid including acetic, propionic, butyric, but preferably is a high molecular weight acid which conveniently is a fatty acid including valeric, caproic, caprylic, capric, lauric, myristic, stearic, decylenic, dodecylenic, palmityloleic, oleic, linoleic, gadoleic, etc. Still other acids include pelargonic, undecylic, tridecylic, pentadecylic, etc. The esters are formed by refluxing the reactants under conditions to liberate water. Preferably at least one mole of acid is reacted per mole of the epihalohydrin-amine condensation product and may range up to the number of acid groups equal to the number of hydroxyl groups in the epihalohydrin-amine reaction product.

The polymeric reaction products containing basic nitrogen specifically set forth in the present application may be summarized as being the reaction product of equimolar proportions of an epihalohydrin and an amine selected from the group consisting of primary and secondary alkylamines, and esters of said reaction product.

The above description illustrates the polymeric reaction products containing basic nitrogen which are used for forming the addition reaction products of the present invention. In the present specifications and claims, the term "basic nitrogen" is used in the generic sense to cover the primary, secondary and tertiary amines including, as stated above, the basic nitrogen-containing heterocyclics. It is understood that the different polymeric reaction or condensation products are not necessarily equivalent when used in forming the addition product.

The oxyalkylenated hydroxyhydrocarbon phosphate or thiophosphate generally is reacted with the condensation product containing basic nitrogen in a proportion of from about 0.5 to about 1.0 acidic equivalents of phosphate or thiophosphate per one basic equivalent of condensation product. However, when the condensation product is prepared from an unsaturated acid, the phosphate or thiophosphate may be used in a proportion of phosphate or thiophosphate equivalents which are equal up to the total of both of the basic equivalent and double bonds in the condensation product. In other words, the thiophosphate perferably forms the addition salt with the basic nitrogen and any excess thiophosphate will add to the double bond in the condensation product. It is understood that applicant is not necessarily limited to the above explanation, but does believe that the reaction proceeds in this manner, and also that a further excess of either reaction may be employed when desired.

The reaction is effected in any suitable manner. The reaction is exothermic and preferably is controlled by effecting the same in the presence of an inert solvent. Any suitable solvent may be employed, an aromatic hydrocarbon being particularly preferred. The aromatic hydrocarbons include benzene, toluene, xylene, ethylbenzene, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of operation will depend upon whether a solvent is employed and, when used, upon the particular solvent. In general, the temperature may range from about atmospheric to about 200° F. and in some cases up to 300° F., although temperatures outside of this range may be employed, depending upon the specific reactants and solvents utilized. The time of reaction will range from instantaneous to several hours or more and generally from instantaneous to one hour. Detailed description of specific methods for effecting the reactions are given in the examples appended to the present specifications. The reaction normally readily is effected in the absence of a catalyst.

The addition reaction product generally is recovered as a viscous liquid. It may be marketed and used as such or as a solution in a suitable solvent including, for example, saturated paraffinic hydrocarbons including pentane, hexane, heptane, octane, etc., aromatic hydrocarbons including benzene, toluene, xylene, cument, decaline, etc., alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The pheneol may be used in a concentration of from about 5% and preferably from about 25% to about 500% by weight and, more particularly, from about 30% to about 200% by weight of the addition reaction product of the present invention.

The addition reaction product of the present invention will have varied utility and is useful as an additive to organic substrates which undergo oxidative deterioration. In addition, the additive serves as a detergent-dispersant, peroxide decomposer, corrosion inhibitor, extreme pressure and lubricity additive, etc. Organic substrates include gasoline, naphtha, kerosene, jet fuel, lubricating oil, diesel fuel, fuel oil, residual oil, drying oil, grease, wax, resin, plastic rubber, etc.

The addition reaction product of the present invention is advantageously used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., esters and particularly triesters in which the ester portions each contain from three to twelve carbon atoms and may be selected from those hereinbefore specifically set forth in connection with the discussion of the neopentyl glycol esters, (3) complex esters composed of reaction products of trimethylol alkane (as trimethylol propane), pentaerythritol, in fact any di- or polyglycol with a dibasic acid, the remaining hydroxyl groups being then esterified with monocarboxylic acids, and (4) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from the corrosion, etc.

The concentration of the addition reaction product to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 10% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutyl-catechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, tetratertiarybutyl-dihydroxydiphenyl methane, etc.

Some of the addition reaction products of the present invention are emulsifying agents and therefore will serve to emulsify water and oil of lubricating viscosity for use as lubricating oil, slushing oil, cutting oil, rolling oil, soluble oil, drawing compound, etc. When desired, an additional emulsifying agent may be employed. Any suitable emulsifying agent can be used including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

In another embodiment the reaction products of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. the reaction products or mixture of these may be used for the control of various larvae, mites, eggs of mites and such insects as flour beetle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

Example I

The addition reaction product of this example was prepared by reacting di-(oxyethylenated nonylphenol)-dithiophosphate, containing one oxyethylene group per each nonylphenyl group, with a polymer formed by condensing hydrogenated tallow amine and epichlorohydrin. The polymer was prepared by forming a solution of epichlorohydrin in a solvent mixture of xylene and 2-propanol and forming a separate solution of the hydrogenated tallow amine. These solutions were mixed in equal mole proportions. One-half of the amine was added gradually to the epichlorohydrin solution with stirring and heating at 130–140° F. Then the remaining portion of the hydrogenated tallow amine was added with continuous stirring and reacting at about 175° F. One-half mole proportion of sodium hydroxide was added and the mixture was heated at about 190° F., after which another one-half mole proportion of sodium hydroxide was added and the mixture stirred and reacted at about 190° F. for about one hour. Following completion of the reaction, the mixture was cooled, filtered and the filtrate distilled under vacuum to remove the alcohol and xylene solvents.

The addition reaction product was prepared by mixing and heating on a steam bath 15.50 g. of the above condensation product with 14.24 g. of di-(oxyethylenated nonylphenol)-dithiophosphate containing one oxyethylene group. The product was recovered as an amber grease having an index of refraction $n_D^{20}$ of 1.5265.

Example II

The addition reaction product of this example was prepared in substantially the same manner described in Example I, except that an ester of the amine-epichlorohydrin condensation product was used. The ester was prepared by refluxing 15.50 g. of the polymeric reaction product of hydrogenated tallow amine and epichlorohydrin with 320 g. of pelargonic acid at 353° F. A total of 37 cc. of water was collected. The ester had a basic nitrogen equivalent of 1.99 meq./g.

The addition reaction product was prepared by mixing and heating on a steam bath 10.06 g. (equivalent to 0.2 mole of basic nitrogen) and 0.2 mole of di-(oxyethylenated nonylphenol)-dithiophosphate containing one oxyethylene group per each nonylphenyl group. An exothermic reaction occurred upon mixing. The product was recovered as a heavy amber oil.

Example III

The addition reaction product of this example was prepared in the same manner described in Example II, except that the dithiophosphate contained an average of six oxyethylene groups per each nonylphenyl group. The addition reaction product was prepared by mixing and heating on a steam bath 10.06 g. (equivalent to 0.02 mole of basic nitrogen) of the pelargonic acid ester of the hydrogenated tallow amine-epichlorohydrin reaction product, prepared as described in Example II, and 37.28 g. (0.025 acidic equivalent) of di-(oxyethylenated nonylphenol)-dithiophosphate containing an average of six oxyethylene groups. Here again, an exothermic reaction ensued. The product was recovered as a heavy amber oil having an index of refraction $n_D^{20}$ of 1.5035.

Example IV

The addition reaction product of this example was prepared by reacting di-(oxyethylenated nonylphenol)-dithiophosphate, containing an average of six oxyethylene groups per each nonylphenyl group, with the polymeric reaction product of N-tallow-1,3-diaminopropane and epichlorohydrin. The polymeric reaction product was prepared in substantially the same manner as described in Example I, except that N-tallow-1,3-diaminopropane ("Duomeen T") was used instead of the hydrogenated tallow amine.

The addition reaction product was prepared by mixing and heating on a steam bath 5.78 g. of the N-tallow-1,3-diaminopropane-epichlorohydrin reaction product and 18.64 g. of di-(oxyethylenated nonylphenol)-dithiophosphate containing an average of six oxyethylene groups. The product was recovered as a heavy amber oil having an index of refraction $n_D^{20}$ of 1.5128.

Example V

As hereinbefore set forth, the addition reaction products of the present invention are of especially utility as additives in lubricating oils. One method of evaluating lubricating oils is by the Falex machine. This procedure is described in detail in a book entitled "Lubricant Testing" anthored by E. G. Ellis and published by Scientific Publications (Great Britain) Limited, 1953, pages 150–154. Briefly, the Falex machine consists of a rotating pin which runs between two V-shape bearings which are spring loaded against the pin and provided with means for varying the load. The oil to be tested is poured into the metal trough in which the pin and bearings are partly submerged. The machine was operated for five minutes each at 250 and 50 pound loads and then forty-five minutes at 750 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The addition reaction product of di-(oxyethylenated nonylphenol)-dithiophosphate and the ester of the amine-epichlorohydrin condensation product, prepared as described in Example II, was evaluated in the Falex machine as described above. The synthetic lubricating oil used in this example was pentaerythritol ester marketed commercially as "Hercules J64."

When evaluated in this manner, the "Hercules J64" oil without additive had a seizure load of 1000 pounds. A sample of the same oil containing two percent by weight of the additive, prepared as described above, had a seizure load of 1250 pounds.

Example VI

The addition reaction product, prepared as described in Example I, is used in a concentration of 0.5% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D-942 method, in which method a sample of the grease is placed in a bomb and maintained at a temperature of 248° F. Oxygen is charged to the bomb, and the time required for a drop of five pounds pressure is taken as the Induction Period. A sample of the grease without additive will reach the Induction Period in about eight hours. On the other hand, a sample of the grease containing 0.3% by weight of the additive of the present invention will not reach the Induction Period for more than 100 hours.

I claim as my invention:

1. The addition reaction product, formed by reacting at a temperature of from atmospheric to about 300° F., in a proportion of from about 0.5 to about 1 acidic equivalent per basic equivalent of a polymeric reaction product containing basic nitrogen to be hereinafter set forth, a compound A being an oxyalkylenated hydroxyhydrocarbon phosphate or oxyalkylenated hydroxyhydrocarbon thiophosphate containing from 1 to 30 oxyalkyl groups of from 2 to 8 carbon atoms each and said hydroxyhydrocarbon being selected from alkyl phenol having at least 1 alkyl group of from 1 to about 50 carbon atoms and aliphatic alcohol of from 6 to 50 carbon atoms, and compound B being a polymeric reaction product containing basic nitrogen and being the reaction product, formed at a temperature of about 65° to about 215° F. of equal mole proportions of epihalohydrin and a primary or secondary alkylamine containing from 12 to 40 carbon atoms or N-alkyl derivative there having from 12 to 25 carbon atoms in said alkyl, or ester of said reaction product formed by reacting said reaction product with an acid having from 2 to 15 carbon atoms.

2. The addition reaction product of claim 1 wherein said compound A is oxyalkylenated alkylphenol phosphate.

3. The addition reaction product of claim 2 wherein said oxyalkylenated alkylphenol phosphate is di-(oxyethylenated alkylphenol)-phosphate.

4. The addition reaction product of claim 1 wherein compound A is oxyalkylenated alkylphenol thiophosphate.

5. The addition reaction product of claim 4 wherein said oxyalkylenated alkylphenol thiophosphate is di-(oxyethylenated alkylphenol)-dithiophosphate.

6. The addition reaction product of claim 1 wherein compound A is oxyalkylenated aliphatic alcohol phosphate.

7. The addition reaction product of claim 1 wherein compound A is oxyalkylenated aliphatic alcohol thiophosphate.

8. The addition reaction product of claim 1 wherein said polymeric reaction product containing basic nitrogen is an ester of the condensation product of hydrogenated tallow amine and epichlorohydrin.

9. The addition reaction product of claim 1 wherein said polymeric reaction product containing basic nitrogen is an ester of the condensation product of hydrogenated tallow amine and epichlorohydrin.

10. The addition reaction product of claim 1 wherein said polymeric reaction product containing basic nitrogen is the condensation product of N-tallow-1,3-diaminopropane and epichlorohydrin.

References Cited

UNITED STATES PATENTS

| 2,904,416 | 9/1959 | Clarke et al. | 44—72 |
| 3,000,824 | 9/1961 | Morway et al. | 252—32.5 XR |
| 3,010,903 | 11/1961 | Clarke et al. | 252—49.9 |
| 3,012,056 | 12/1961 | Cyba | 252—32.5 XR |
| 3,012,964 | 12/1961 | Pollitzer | 252—32.5 |
| 3,017,357 | 1/1962 | Cyba | 252—32.5 |
| 3,169,923 | 2/1965 | Guarnaccio et al. | 252—32.5 |

DANIEL E. WAYMAN, Primary Examiner

I. VAUGHN, Assistant Examiner

U.S. Cl. X.R.

252—32.5, 32.7; 260—920, 924